United States Patent [19]

Stinnes

[11] 4,295,917
[45] Oct. 20, 1981

[54] WINDING OF FIBRES

[76] Inventor: Wolf W. Stinnes, 31 Johann Rissik Dr., Waterkloof Ridge, Pretoria, South Africa

[21] Appl. No.: 974,422

[22] Filed: Dec. 29, 1978

[30] Foreign Application Priority Data

Dec. 29, 1977 [ZA] South Africa .................. 77/7700

[51] Int. Cl.$^3$ .............................................. B65H 8/00
[52] U.S. Cl. .................................. 156/428; 156/172; 156/173; 156/244.13; 156/431; 156/500
[58] Field of Search ................................ 156/425–432, 156/173–175, 169, 443; 186/468, 475, 392; 242/4 R, 4 A, 4 B; 57/3

[56] References Cited

U.S. PATENT DOCUMENTS

| 1,998,909 | 4/1935 | Rosener | 156/392 |
| 3,125,307 | 3/1964 | Buralli | 242/4 B |
| 3,549,454 | 12/1970 | Roberts | 156/425 |
| 3,714,769 | 2/1973 | Tsuchiya et al. | 57/3 |

Primary Examiner—David A. Simmons
Attorney, Agent, or Firm—Berman, Aisenberg & Platt

[57] ABSTRACT

A machine for winding of fibres, especially as a circumferential reinforcement to a pipe extrudate in an extrusion channel, which comprises an open ended hollow rotating fibre carrier and guide around the object, the carrier being adapted for the accumulation of turns of fibre on its outside, the guide being adapted to lead the fibre from the turns accumulated on the outside of the hollow carrier inwardly to the object and, means adapted to rotate the carrier with the guide wherein the outside of the carrier comprises fibre support means adapted for the easy rotation of the accumulated turns of fibre relative to the carrier, and further comprising a stationary fibre bank for supplying the carrier with fibre, means adapted to reverse the direction of rotation of the carrier and buffer means intermediate between the carrier and the fibre bank adapted to temporarily take up turns from the carrier during reverse rotation. The buffer means is preferably a second, concentric outer hollow carrier also adapted for easy rotation of accumulated turns of fibre. A reciprocable clamp batten is disclosed to clamp fibre at the object at the moment of reversal of rotation. A lip gasket is described to provide for admission of the fibre to the extrusion channel.

8 Claims, 9 Drawing Figures

WINDING OF FIBRES

BACKGROUND OF THE INVENTION

1. Field of the Invention

This invention lies in the field of winding of fibres. The broad sphere of application of the invention is to the winding of any form of fibre, filament, cord or any analogous structure. The invention is furthermore applicable to the winding of such fibre for any purpose.

2. Prior Art

In the field of large diameter, high pressure pipes, people have for some time looked into the possibility of manufacturing pipes from reinforced plastics. The idea was to combine the high corrosion, abrasion and crack resistance of many plastics with the high tensile strength of all sorts of fibres, especially the cheap glass fibres, which combine a very high ultimate tensile strength with a practically equally high yield strength. The glass fibre does show practically no creeping even under strong load.

In the case of pipes for pipelines with a high internal pressure the stress directions are practically circumferential and axial. For a maximum reinforcement effect one therefore has to wind in layers of endless circumferential fibres (rovings), and provide axial fibres.

For continuous pipe production by extrusion one needs a device that provides axial and circumferential fibres (rovings) continuously without any interruption. This is especially important with any process combined with a pipe extruder, since any stopping of the extruder causes deterioration of the extruded material.

In the case of small extruded pipes big, quickly rotating discs with spools are used to put the circumferential fibres on while the axial fibres are drawn from a standing spool bank into the protruding extruded material. Naturally, the spool discs have to be stoppped from time to time to put new spools on with a resulting interruption in the extrusion process.

For a given inside pressure the quantity of required endless fibres in the laminate per unit pipe length grows quadratically with the pipe diameter, as does the mass of the extruded material. Since the material wasted inside the extruder with each stop grows cubically with the extruder size and the pipe length manufactured in one shot decreases quadratically with the pipe diameter for a given rotating disc, the extruded material waste portion grows at least with the fourth power of diameter. The spool disc device is therefore rendered absolutely impractical for pipe diameters over 100 mm. U.K. Pat. Nos. 1 191 711 and 988 789 describe machines which are subject to similar shortcomings.

As a compromise short glass fibres are nowadays worked into the polymerisate and, together with the thermoplast, extruded. This approach, however, attains only a small fraction of the strength attainable by reinforcement with endless fibres. At the same time it requires very expensive extruder dies made from exotic, highly alloyed steel to withstand the high abrasion, caused by the short glass fibres, even for a very limited time.

In the Drostholm process use is made of continuous filament winding procedure with resin added to the wound fibre. The mandrel, on which the fibres are wound, consists of a parallel helically wound, endless steel tape. At the end of the "mandrel" the endless tape disappears into the rotating helical pipe appearing at the other end of the helix and starting the cycle again. This process shows three disadvantages:

(a) In the axial direction only short glass fibres can be brought in more or less at random;

(b) Only a low winding speed is possible since centrifugal forces tend to cast out the resin;

(c) The machine is expensive and complicated. The helical mandrel is only accessible after dismantling the machine.

So even in the field of directly setting (duroplastic) resins further improvements on pipe manufacturing should be found to allow for the mass production of highly reinforced pipes with circumferential and axial endless straight fibres.

The common point of the foregoing deficiencies lies in the fact that with every type of winding process which makes use of a rotating set of fibres, it was thought to be necessary to rotate the spool bank and the mandrel relatively to each other. The innovation below will show that this is not necessarily true. It thus opens a completely new field in high speed, continuous, endless fibre reinforcement of pipes, sheets, profiles and all types of containers.

SUMMARY OF THE INVENTION

A machine for winding of fibres onto an object in accordance with this invention comprises an open ended hollow rotating fibre carrier and guide around the object, the carrier being adapted for the accumulation of turns of fibre on its outside, the guide being adapted to lead the fibre from the turns accumulated on the outside of the hollow carrier inwardly to the object, and means adapted to rotate the carrier with the guide wherein the outside of the carrier comprises fibre support means adapted for the easy rotation of the accumulated turns of fibre relative to the carrier, and further comprising a stationary fibre bank for supplying the carrier with fibre, means adapted to reverse the direction of rotation of the carrier ad buffer means intermediate between the carrier and the fibre bank adapted to temporarily take up turns from the carrier during reverse rotation.

With this simple embodiment of the invention, fibre from the spool bank may be wound onto an object, for example a pipe, on a mandrel located within the toroidal carrier without it being necessary for the object to be rotated or for the spool bank to be rotated. During this operation, however, turns of fibre are accumulated on the carrier and, at a certain stage, its direction of rotation must be reversed, whereupon winding of the fibres onto the object continues in the opposite direction, and the accumulation of fibres on the carrier is reduced. The fibres, during the reverse rotation must be partly and temporarily rewound onto the spools of the spool bank or taken up in some manner by the means provided between the carrier and the spool bank. Accordingly, the preferred embodiment of the invention comprises two concentric hollow carriers, provided by the addition of an outer carrier around the carrier referred to above and which will be referred to hereinafter as the inner carrier, the fibres proceeding from the spool bank to the outer hollow carrier, being accumulated in several turns on this outer carrier, then proceeding from the outer carrier over a guide thereof to the inner hollow carrier, turns of the fibre being accumulated also on the inner hollow carrier, and then proceeding from the inner toroidal carrier over a guide thereof to be wound onto the object. With this embodiment it is possible to select the parameters of diameter and rotational speed of the two carriers so that the direction of movement of the fibres from the spool bank is not reversed at any stage and instead, apart from the brief moment of directional reversal of the carriers, will be drawn from the spool bank at a substantially constant speed. This permits the spools to be made with conventional simple brakes.

This invention thus further provides a process of applying windings of a fibre or the like which consists in the employment of a machine in accordance with the invention, operating the machine first in one direction so as to apply windings around an object in one direction, while accumulating turns on the carrier of the machine, reversing direction of the machine so as to continue applying windings, but in the other rotational direction, thereby reducing the windings on the carrier and cyclicly repeating these steps.

This process, as stated in the introduction, may be applied to any purpose and a particular purpose is that the application of the fibres in the form of reinforcement to pipes or vessels, drums or other structure. The process may thus be combined with an extrusion process, whereby the fibres are applied as reinforcement to material being extruded. In this process the fibres may be applied substantially to the outer surfaces of an already extruded pipe or vessel or, in a preferred process, the fibres may be applied upstream of the final extrusion die to thereby fully penetrate the depth of the extruded material and intimately mix with the extruded materials. In all embodiments of the process combined with extrusion or with longitudinal movement of the body to which the windings are applied, the component of velocity introduced by the longitudinal movements results in the windings of course being applied in a helix. Thus, in a further refinement of the process, it may be carried out simultaneously in two directions so that two opposite handed helices are applied so as to achieve symmetry of the applied helices. In extrusion embodiments extrudate to which fibres are applied or in which fibres are incorporated has sufficient viscosity and adhesive properties to permit reversal of winding direction without back spooling.

BRIEF DESCRIPTION OF THE DRAWINGS

Further aspects of the machine and of the process in accordance with the invention will be clarified in the description which follows with reference to the accompanying drawings in which FIGS. 1,1, 1,2, 2,1 and 2,2 are entirely schematic representations for the purpose of illustrating the principle of operation of the machine in accordance with the invention;

FIGS. 1,1 and 1,2 show a first elementary embodiment of the invention, and FIGS. 2,1 and 2,2 show a second, preferred embodiment of the invention;

DESCRIPTION OF THE PREFERRED EMBODIMENTS

In order to illustrate the principle of the invention with reference to FIGS. 1,1, 1,2, 2,1 and 2,2 we ignore for the time being any axial speed of the mandrel or extrudate 2 and concentrate on the circumferential winding operation. This winding operation has to be broken up into two modes, since (for topological reasons) a one-mode winding operation onto a mandrel 2 without crossing its axis is impossible, if (for a continuous process) no piling up or loosening of fibres is allowed. Arrow 4 in each figure shows the direction of fibre feed.

Mode 1 (FIG. 1,1): clockwise rotation; Carrier 3 with small rolls (now shown) and guide 8 rotate with forward angular speed $\omega_i$. They thereby wind up a helix 5 of fibres 6 on the small rolls. At the same time a helix 7 of fibres is deposited onto mandrel 2.

After n turns of carrier 3, n layers of fibres 6 are wound onto the helix 5 and onto helix 7. At a predetermined figure of n layers the winding direction has to be reversed with maximum acceleration.

Mode 2 (FIG. 1,2): counter clockwise rotation; Carrier 3 rotates now into the opposite direction with the same rotational magnitude $-\omega_i$. The rotation in the opposite direction is chosen to have the same magnitude in view of the fact that in practice the mandrel onto which the fibres are wound is advanced axially with a speed which is normally kept constant and accordingly, in order to preserve the same winding helix angle in both directions of winding, the speed of rotation must be the same in both directions. In the rewinding direction, as shown in FIG. 1,2, however, the fibre is wound off from the inside of helix 5 and is deposited on the mandrel 2. Fibre 6 is now moving backward to a spool bank (not shown) with a speed related to the angular speed $\omega_i$ and the difference between the radii of the carrier 3 and mandrel 2.

Assuming that the forward winding and the reverse winding are continued as equal magnitudes of rotational speed and for equal time durations, the average speed at which fibre is drawn from the roll bank can be computed. The reverse winding which results in backspooling is unacceptable in practice if additional means for taking up the fibre is not provided. The reason is that large banks of spools are employed, and in practice it is not feasible or economical to provide reverse drives for all of the spools on a bank.

We now refer to FIGS. 2,1 and 2,2; FIG. 2,1 indicates the rotation of two carriers counter clockwise and FIG. 2,2, rotation of two carriers clockwise.

In order to maintain the average speed with the continuous drawing of fibres 6 from the spool bank, which avoids the complicated backspooling, we have to employ a further device, which allows the intermediate storage of fibres 6. This device consists of an outer carrier 13 and guide 9, which carry an outer fibre helix 14 on a further set of small rolls.

It has been established by the inventor that, by driving the outer and inner carriers in the same directions at any one time and at suitable relative speeds related to their relative radii, backspooling can be avoided both when the inner and outer carriers are rotating clockwise and when they are rotating counter clockwise, providing an initial store of windings is provided on (preferably) the outer carrier. Furthermore the relative speeds can be the same for both directions of rotation.

This is a very important result because, with the ratio of rotational movement between the inner and outer carriers being the same, forward and backward, carriers 3 and 13 and guides 8 and 9 can be connected with a simple, fixed gear transmission. Only a single motor drive is necessary. By looking at the respective angular speeds we obtain the equation:

$$\omega_a = \omega_i \frac{R_i}{R_i + R_a}$$

Where
$\omega_a$ = rotational speed of outer carrier 13
$\omega_i$ = rotational speed of inner carrier 3
$R_a$ = effective radius of outer carrier 13 with rollers
$R_i$ = effective radius of inner carrier 3 with rollers.

During counter clockwise operation windings on carrier 13 increase and on carrier 3 decrease, i.e. windings appear to be transferred; before the windings on carrier 3 are exhausted, the rotational direction must be changed and, during clockwise rotation windings on carrier 3 increase and on carrier 13 decrease. The number of the intitial windings in the store on one of the carriers determines the number of windings put onto the mandrel between direction changes.

We may now refer to FIG. 3, and the operation described with reference to FIGS. 2,1 and 2,2, applies to the machine shown in FIG. 3 and corresponding parts are referred to by the same reference numerals. This machine applies the windings onto a pipe extrudate 10 advancing in the direction indicated by arrow 1 on the mandrel 2. Rollers 11 are shown on each of the frames 3 and 13, and it is important the rollers are mounted on low friction roller bearings so that rolling resistance increases very little with increase of load applied by the helix windings 5 and 14. With the machine becoming bigger, $\omega_a$ tends to grow $\omega_a \to 0.5 \omega_i$, which supplies us with the approximate formula:

$$n_a (\text{layers deposited on carrier 13}) = 2n_i$$

(Layers on carrier 3) with clockwise rotation. That means, if we are to change winding direction after every 100 layers, only about 50 layers have to be deposited on carrier 3.

As a typical example the glass fibre has a thickness of 0.3 mm. That allows 1000 layers in a 30 cm helix on carrier 3 or about 2000 layers to be deposited on mandrel 2 before we have to change the rotational direction of the machine. If we wind with a width of fibres of 1 m onto an axially moving (non-rotating, extruded) pipe extrudate on a mandrel 2, we wind 60 m pipe length of 1 m diameter, (suitable for an inside pressure of about 100 bar), out of these 2000 layers without changing the rotational direction: thus the quasi-continuous process can be regarded as a continuous process for all practical purposes.

With the depositing of so many fibres in the helices 5 and 14 the radii $R_i$ and $R_a$ cannot be regarded as constant any more. Since, however, a tension keeping device 18 is employed to keep tension 17 at a predetermined level, the speed 19 of the incoming fibres will vary slightly, This will not affect the process.

REMARKS (1) Carriers 3 and 13 should be made as light as possible to keep the rotational momentum as low as possible for easy de- and acceleration. They run on rollers 15.

(2) $R_i$ and $R_a$ are, strictly speaking, not radii but rather approximate radii, since we do actually work with polygons. This again can only affect speed 19 slightly.

Figure 1:
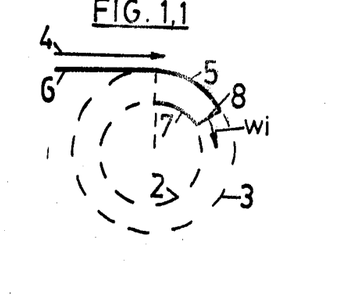
Figures 1, 2:
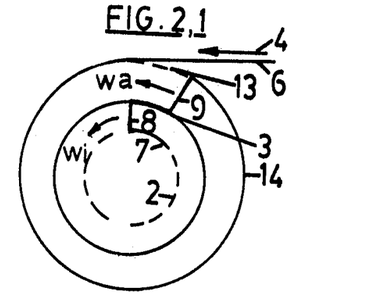
Figures 1, 2, 4:
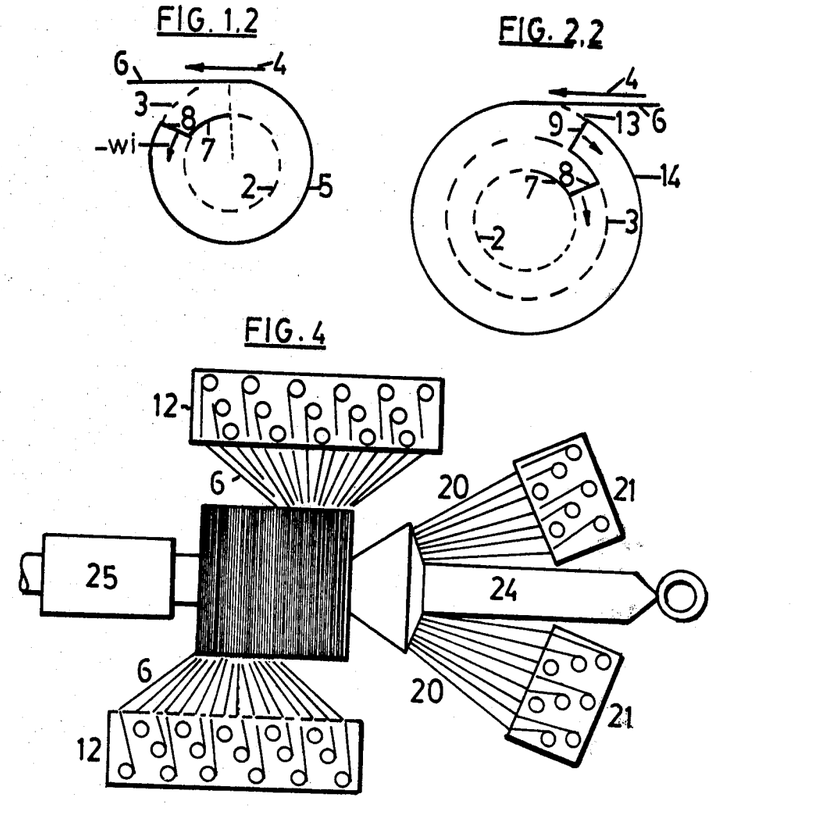
FIG. 4 is a schematic plan view of another embodiment of the invention applied in the context of extrusion of pipes.

(3) Two machines in line can supply a symmetrical winding pattern, as shown in FIG. 4. FIG. 4 shows extruder 24 and cooling channel 25.

(4) With the non-rotating mandrel 2 and extrudate 10 axial fibres 20 can be drawn in continuously from axial spool bank 21. We thus obtain the ideal laminate of non-woven axial and circumferential fibres.

(5) The extruding speed of extrudate 10 should be (mechanically) related to the magnitude of $\omega_i$ (and thus $\omega_a$) irrespective of direction so that the winding angle is kept constant during the acceleration and deceleration periods.

(6) The tension 17 keeping device 18 should be constructed in such an manner, that it can absorb some fibre length during the rotation directional change in the machine. To that end carrier 18 with rolls 22 is employed with fibres 6 running through its axis. Tension 17 is controlled by helical springs 23 tending to rotate carrier 18 against tension 17. If tension 17 diminishes, carrier 18 rotates as far as possible, thus storing fibres. With device 18 we provided a nearly constant winding speed to the spools on bank 12. That is important, when many spools are employed. Carrier 18 could theoretically take over the function of carrier 13. But then it should be much bigger and in general it would need an extra drive. So, this solution seems to be not as advantgeous as the embodiment shown in FIGS. 2,1 2,2 and 3; however it could be applied to the embodiment shown in FIGS. 1,1 and 1,2 and discussed with reference thereto.

(7) If during the moment of winding direction change fibres 6 become loose and are not properly deposited onto helix 5 or mandrel 2 or even pulled back by device 18, only a limited winding movement should be allowed to carrier 18. Pairs of rolls could also be employed instead of rolls 8 and 9 locking and forcefully feeding fibres 6 further during the directional change, thus overruling the pull back effect of carrier 18.

Figure 5:
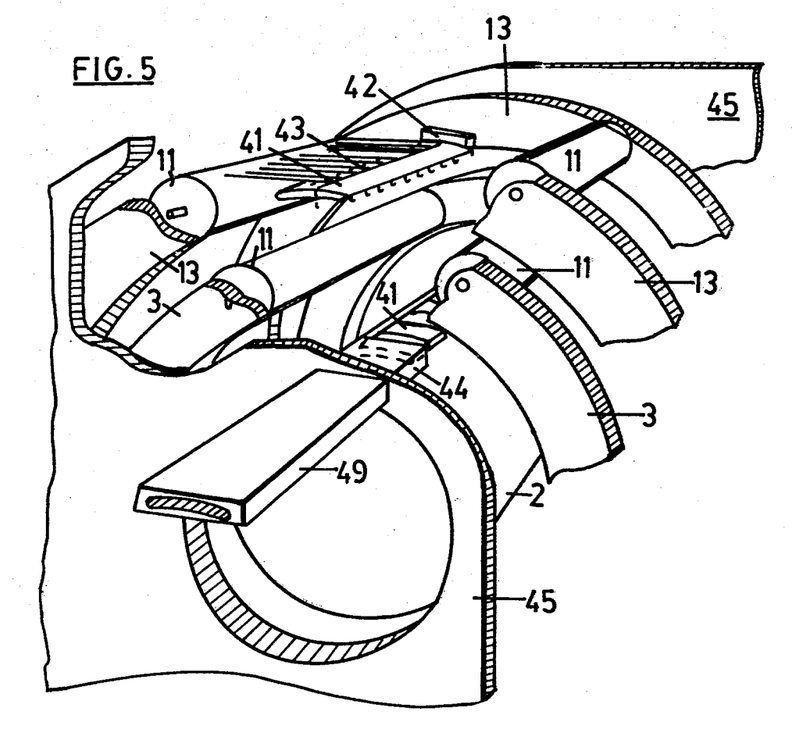
FIG. 5 is a perspective partial view of the machine shown in FIG. 3 showing other aspects.
Figures 6, 7:
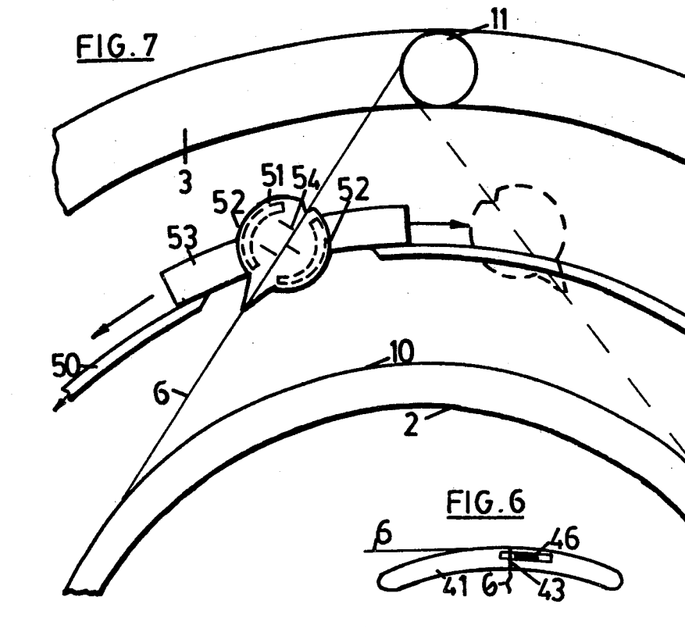
FIG. 6 is a detail view of a part seen in FIG. 5.
FIG. 7 is a partial sectional view transverse to the axis of rotation of the machine.

(8) FIGS. 5 and 6 show a clamp batten used both to deposit the initial windings and to provide a more positive control of fibres on the mandrel at the moments of direction change.

(A) Starting the machine.

In order to deposit the initial windings into helix 14 by means of clamp batten 41, which is clipped to fasteners 42 in carrier 13, the leading ends of fibres 6 are fixed to batten 41 by means of clamping mechanism 43. After depositing the desired number of fibre windings into helix 14 on carrier 13 by rotation of the machine in a pulling action against spool bank 10 the machine is stopped, batten 41 de-clipped, pulled by hand through carrier 3 onto mandrel 2 and then fastened in axial direction again to fastening devices 44 in housing plates 45. With the leading ends of fibres 6 thus secured at the mandrel surface, the actual manufacturing operation with the reversing of the rotational direction and the applying of resin can start.

After some further revolutions of the machine batten 41, however, must be removed to allow the pipe or profile to proceed in axial direction. To that end the externally-operated cutting mechanism 46 cuts the leading ends of fibres 6 off thus freeing batten 41 after some windings have been deposited on mandrel 2. The fastening mechanism 44 remains permanently connected to batten 41 at one side during the following working period. While batten 41 slides out of housing 45, the first fibre windings close up around mandrel 2 thus fastening and locking themselves so that no slip of fibres 6 on mandrel 2 takes place.

This whole positioning of batten 41 during the start can most easily be done by hand. To that end orifices in the housing plate 45 allow access to the inside of the machine. The applying of resin only starts after batten 41 is positioned next to mandrel 2 so that the initial handling of batten 41 is not hindered.

(B) Change of Rotational Directions:

As pointed out earlier the rotational direction of the machine has to be reversed from time to time before one of the two helices 5 or 14 runs empty. One thereby sustains the mutual fibre 6 transfer between the helices in order to keep the fibre speed 19 from spool bank 12 constant. To avoid the running out of fibres in one of the two helices two electronic eyes, which provide a digital signal of minimum number of fibres or an analogue signal of the thickness of the helix, are employed to watch carriers 3 and 13. As soon as the preset minimum number of windings at one of the carriers 3 or 13 is reached, the rotational direction is automatically reversed at the electric motor drive 29 by means of an automatic process control device. We recall from the previous section that the number of windings in one direction is determined by the initial number of windings in the "initial feeding helix" 14.

To change direction one of the two fasteners 44, which is permanently fastened to batten 41, is guided with guide 49 at the outside of housing plate 45. With this device batten 41 is automatically inserted along mandrel 2, slipping into the opposite fastening 44 to avoid undue torque through the reversing fibres 6 at the guided end of batten 41. Insertion takes place at the instant of no rotation during the reversing period. Batten 41 is then extracted automatically with the aid of fastener 44 and guide 49 after a predetermined number of reverse windings are deposited, which will lock themselves on mandrel 2.

A more refined construction would even allow to move batten 41 against mandrel 2 in dependence of the already deposited material during the automatic insertion operation. This would be to minimize the surplus fibre length in the first reversed windings after extraction of batten 41, by virtue of the batten being as close as possible to the mandrel. Lost battens could also be used. Since, for every feeding roll 11, one batten 41 and accessories are required, their number should be kept small.

(9) The application of the machine to circumferential reinforcement of a pipe extrudate in the extrusion channel requires use of a lip gasket. This is described with reference to FIG. 7.

For the sake of versatility and low machine costs the size dependant parts in the machine have to be interchangeable. Obviously mandrel 2 and the die fall under this category. But even cylindrical pipe 50, rotating together with carrier 3 at speed $\omega_i$ and forming the outer part of the extrusion channel, should well be made interchangeable for the following reasons:

(1) Laminar flow is most important with any extrusion and cannot be maintained if a sudden jump in flow cross section is experienced from the extruder to the winding channel or from there to the die. With no laminar flow present we may encounter settling and degradation problems with the thermoplastics. The inner diameter of the cylindrical pipe 50 must therefore be as near as possible to the outer diameter of the extruded pipe (which in the die may change shape to a special profile.)

(2) Centrifugal forces at the inner walls of cylindrical pipe 50, rotating with angular speed $\omega_i$, must be kept as low as possible to avoid sticking of the thermoplastic to the wall surface. The inner radius of cylindrical pipe 50 must therefore be kept as small as possible. It is always advisable to choose angular speed $\omega_i$ low enough to keep the centrifugal forces at this surface under one g (42.7 r.p.m. for 1 m $\phi$). A coating of high temperature low friction material like polytetrafluoroethylene is almost essential to keep friction at the surfaces of the winding channel as low as possible.

(3) The fibres 6, sliding through lip gasket 51 into cylindrical pipe 50, should always be straight to avoid deformation of the gasket with the consequent leaking problems. To that end gasket 51 should be positioned on the tangent between mandrel 2 and feeding roll 11 of carrier 3 for a given winding direction. Therefore cylindrical pipe 50 should be as remote as possible from feeding roll 8 of carrier 3.

Since fibres 6 do pass through gasket 51, fibre guiding batten 41 also has to pass through it. That can be achieved by dividing gasket 51 into two longitudinal strips, each one attached by means of tongue elements 52 to holding clamp 53. Clamp 53 can slide on cylinder 50 in circumferential direction. With the two holding clamps 53 moved apart and forming a slit, batten 41 can easily pass the slit and be fastened on mandrel 2. Thereafter clamps 53 are moved back against each other, needles 54 are guided into the corresponding holes of the opposite half strip of gasket 51 and holding clamps 53 are secured in their working position by means of screws or clips. With gasket 51 showing a cylindrical cross section except for the lips and therefore being able to rotate to a limited extent between clamps 53, fibres 6 are through their tension able to orientate the interface inside the gasket between the lips as to match the tangent between feeding roll 4 on carrier 3 and mandrel 2, if cylindrical pipe 50 is allowed a limited rotation against carrier 3 so that the centre of gasket 51 can match the tangent at either winding direction. Since the material for gasket 51 must be heat resistant, elastic, highly resilient, abrasion resistant and show low friction, one or other polytetrafluoroethylene blend should be at present the most appropriate material for standard extruders.

Figure 3:
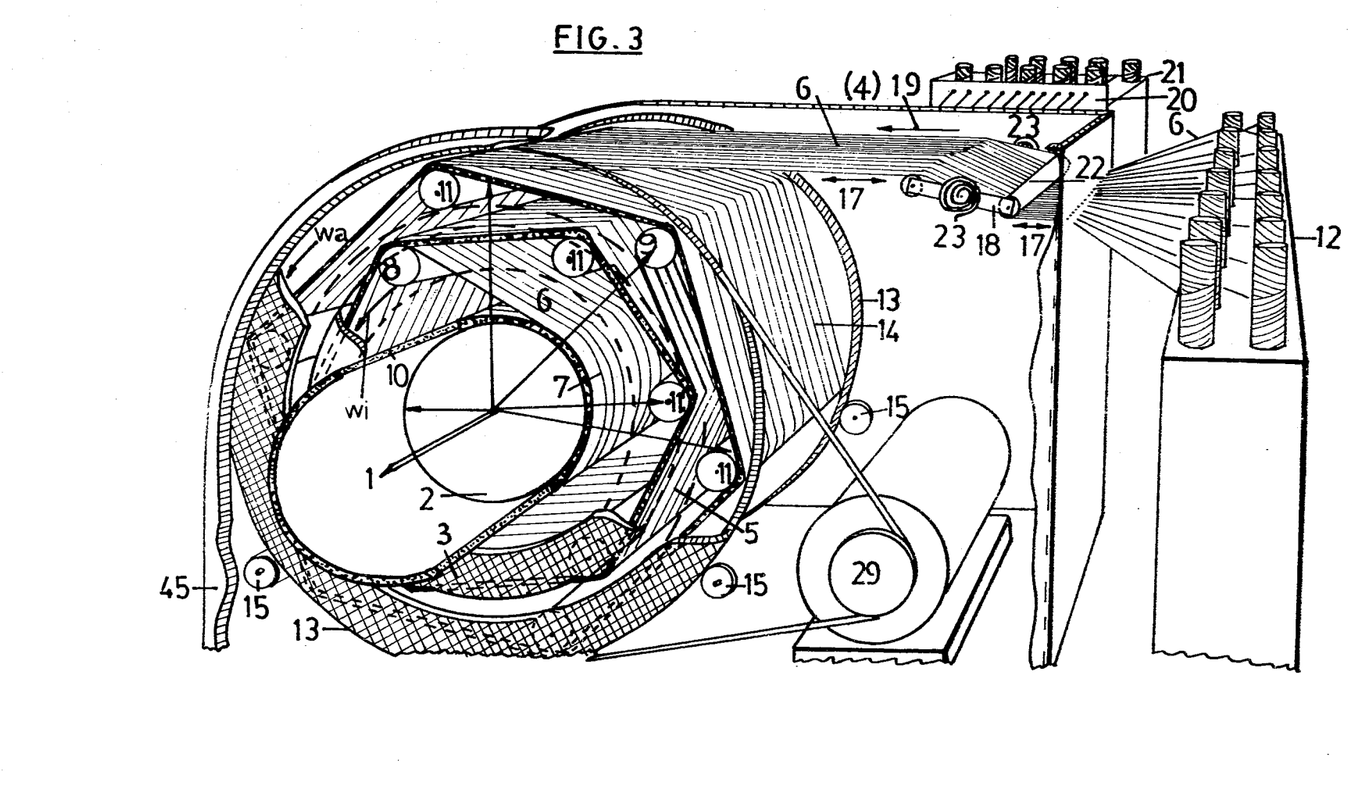
FIG. 3 is a schematic perspective partial representation of the preferred embodiment of the invention applied in the context of pipe extrusion.

In the application to pipe making both in FIG. 3 and in FIG. 4 the fibres are wound into the plasticized thermoplast thus manufacturing a more homogeneous pipe. The rotating, heated machine is placed directly behind the extruder 24. Hereby the die is placed behind the machine so that the final pressure fall takes place behind the winding operation and the pipe is finally formed there. The machine is thus part of the extrusion channel.

If a cooled mandrel is employed, an inner hard pipe layer will be formed preventing the fibres to touch the mandrel. The final pipe will thus show a very welcome, resin rich, inner layer.

A similar effect can be achieved by putting some equally spaced ribs in axial direction onto the mandrel at places where a winding helix is formed on the mandrel. This rib would furthermore cause a more laminar extrudate flow in the extrusion channel. The higher the fibre content with the non-rotating fibre layers is, the more is rotatory motion of the extrudate inside the extraction channel inhibited thus causing a more laminar inside flow.

The mandrel should be extended through the whole cooling zone 25 (see FIG. 4) thus forcing the thermoplast to shrink only in wall thickness and not pipe radius. This is necessary since its linear thermal shrinkage is in the average 10 times higher than that of the glass fibre for instance. To that end the die could be extended into the cooling zone, if the back pressure does not become too high.

If the shrinkage in diameter during cooling is appreciable the pipe couplings must be designed accordingly because the pipe will under pressure quickly blow up right to the point, where the glass fibres are straightened again and thus take the load. The maximum possible shrinkage will be below 3% of the diameter but with the right cooling over the extended mandrel the diameter shrinkage should be forced into the vicinity of the glass shrinkage even with the very high thermal expansion coefficients of polyethylene and polypropylene. If limited pipe lengths have to be manufactured, pipe cutters moving along with the extruded pipe for the cutting operation are commercially available.

The process opens new possibilities for the reinforced extrusion of completely different materials like for example rubber and fast curing concrete.

By just changing the die nearly any type of highly reinforced, hollow profile can be extruded.

By letting the pipe collapse in the heated die or by cutting the pipe behind the die and by rolling the outcoming material during the cooling period high quality, heavily reinforced, endless sheeting can be manufactured. The commercially most interesting resins seem to be polyvinylchloride, polyurethane, polypropylene, polytetrafluoroethylene. Rubber sheeting could be manufactured with the same method. During the rolling process any type of open profile can be made.

With a programmed process control even hollow profiles with changing radius can be manufactured by varying the parameters periodically. In this case an elastic die would be most important to adapt to the (in this case) outcoming, endless segmented mandrel. The same would apply to the entrance of the mandrel into the extrusion channel. High pressure, ellipsoidal tanks could for instance be manufactured this way by cutting the extruded pipe at the smallest place.

WINDING OF RESIN CARRYING FILAMENTS

To use the present machine for filament winding over a mandrel 2 one has to add resin (epoxy, polyester, polyurethane, directly-polymerising polyamide) to the fibre. To keep the rest of the machine clean it seems most practical to modify roll 8 in such a way that fibre 6 will be led through a set of wetting rolls, that receive resin out of a roll closed tank parallel to the roll set 8. The tank should be fixed to carrier 3. The resin is fed in through a circumferential sliding channel, where the rotating part is connected to the tank of rolls 4 and the standing part is connected to the resin feeding pipe. The sliding channel should be easily dismantleable for rapid cleaning. The machine shows its real virtues with a continuous process. Therefore a mandrel 2 has to be employed which protrudes continuously, by means of one of the following devices:

(a) A thermoplastic pipe, preferably extruded directly into the machine, serves as a liner and a continuous, lost mandrel. Thereupon the reinforced pipe is wound; or (b) collapsible steel pipe sections are connected and continuously fed into the machine. After curing and cutting the endless pipe into appropriate lengths, the steel pipe sections are recovered and re-used. For the same goal inflated bags or similar devices may be used; or (c) a polished steel pipe is completely covered by a non-sticking material, polytetrafluoroethylene, that can easily move on the pipe (lubricant). From the inside the cover is kept in position and driven backwards by a set of wheels. It thus provides an endless protruding mandrel 2. The backwards movement of mandrel 2, induced by friction, is halted by a set of rolls at the rear end.

In all the cases the axial fibres are fed in with the protruding mandrel.

Advantages of the process:

(1) The process allows endless, axial fibres to be fed in thus providing a much better laminate than the Drostholm process.

(2) The machine is simpler and therefore cheaper than the Drostholm machine.

(3) The machine allows winding continuously directly onto the thermoplastic liner as it leaves the extruder (no rotation) thus providing a highly labour saving, one step operation.

(4) Centrifugal forces are only active on the single fibre but not on the wound on laminate thus allowing a slightly higher winding speed than the Drostholm process.

(5) With a dry winding process an endless, nonwoven mat can be formed by letting the fibres slide over a non sticking surface and leaving the "pipe" to collapse or be cut open. Thereafter the mat is further led between rolls. The crosspoints can be fixed by a resin glue for easier further handling. This mat could be used for sheet manufacturing in a second process or pipe reinforcing in a centrifugal moulding process.

(6) Endless sheeting could be manufactured by the process continuously by letting the outcome pipe collapse or being cut before final curing, similarly to the extruded sheeting.

(7) By employing a computer programmed process control for the appropriate variation of the parameters and by using "lost" mandrels in a continuous line all types of even non round items may be manufactured. Items showing hollow areas to the outside have first to be wound with a corresponding area voluted to the outside. After collapsing of the voluting bag the laminate can be pressed to the inside thus forming the required hollow area.

CONTINUOUS ROTATIONAL MOULDING

Rotational moulding is so far exclusively used for the manufacturing of completely closed objects like tanks. At the walls of the closed form, where sometimes a reinforcement layer is fixed, polymerisation takes place out of a pre-polymer solution. The walls here serve as "polymerisation kernels". The container form is steadily rotated around at least 2 axes (sometimes programme controlled) so that all parts are wetted and eventually evenly covered with polymerised resin, when the solution is used up.

Nylon (trademark) tanks are for instance manufactured in that manner. Since 1974 the interesting Nylon 12 (trademark) can also be polymerised. In the case of pure pipe manufacturing we only need one single, horizontal rotation axis parallel to the pipe axis, usually coinciding therewith.

For the manufacturing of continuous piping we need a horizontal drum containing the pre-polymer solution. Coaxial with the drum and at the rear end thereof a machine is mounted with radius of mandrel 2 being the same as the drum radius. Mandrel 2 and the rear drum plate rotate with the same angular speed. Fibres 6 are fed from all the rolls 12 through orifices into mandrel 2 and then drawn into and through the drum parallel with the drum axis without twisting, to provide axial reinforcing fibres.

This operation could beforehand not be done from a standing roving bank without twisting the now parallel outcoming fibres 26. Two ways are now open for the manufacturing process:

(a) In the case where a drum liner can be found, that prevents polymerisation at the drum walls, the drum cylinder remains steady while the circumferential fibres are wound in through orifices in the drum cylinder over the "pipe" formed by the axial fibres 20 standing under tension. The circumferential fibres mentioned are drawn from a standing spool bank. In this case the "polymerisation kernels" are formed by the fibres only. The front plate of the drum is fixed to the rear plate and kept in position from there. The finally polymerised pipe leaves the drum through a lip gasket or die at the front plate.

(b) In the case where a certain amount of polymerisation takes place at the cylinder walls the cylinder of the drum rotates together with the end plates. The circumferential fibres are fed in from a second and/or even third machine, whereby the drum with orifices forms the "mandrel(s) 2" of these circumferentially winding machines.

ADVANTAGES OF THE PROCESS (1) Directly polymerising resins, formerly only usable in discontinuous processes, can now be used for the mass production of reinforced pipes or other profiles. Here again we obtain the best possible pipe reinforcement.

(2) The same principle can be applied to a centrifugal moulding process. If it is discontinuous, there can always be enough fibres stored in the machine to wind one pipe length without changing the winding direction.

With the foregoing it was not intended to express that the application of the machine is restricted to these at present most important continuous manufacturing processes.

There are other possible applications of the machine, some of which are mentioned below:

Mandrel moving forwards and backwards

A little variation of the machine used in the last two processes would allow mandrel 2 not to be fixed to carrier 3 but to move backwards and forwards with a certain speed while rotating with the same angular speed. In this way various layers of axial and circumferential fibres could be laid into a centrifugal moulding rotor. The circumferential fibre laying and resin casting device has to be attached to the moving mandrel. This alternative to the process could successfully be used in the casting of big containers with varying diameters.

Variation of mandrel axis direction

Another variation of the original machine would allow changing the originally co-axial direction of the axis of mandrel 2 around the centre of the machine. With a lost mandrel as liner big, high pressure containers could be manufactured in one piece by a type of filament winding process. The advantage for big containers would be the high winding speed of the machine, which allows much shorter production cycles than the presently existing machines. A further advantage for big containers would be that the carrying axis of the container itself does not need to do the high speed spinning movement, thus avoiding serious balancing problems, but does only a very slow movement to cover the whole area of the container with windings evenly. In the case of very big and heavy containers the machine could even be modified to turn around with respect to the axis of the completing resting container. In this way containers could be manufactured with the continuously winding machine, whose dimensions and speed of manufacturing would exceed by far everything existing today.

Movement of machine along mandrel axis

For the filament winding of very big, long and more or less rotation-symmetrical objects it seems more practical to move the machine along the axis of the object, serving as a standing mandrel, since we are looking at very big and bulky objects. An interesting way here is to wind over inflatable mandrels which could be hydrogen or helium filled to overcome problems with the weight of the deposited windings and/or problems at the supports. They could thus be put to the ends of the object. This together with the combination of two or more machines with opposite rotation direction and attachment of an axial fibre laying device would make it possible to manufacture giant objects (even ships) in one piece.

Depositing of Resins directly on the Mandrel

The feeding of resins via a sliding split toroidal container as used in the film wetting process and mounted at the machine is by no means restricted to a fibre wetting roll device at roll 11. The resin tanks fixed to carrier 3 can supply the resin directly to the mandrel via a spraying head or a roll device on the mandrel (or both) thus applying a resin layer with every rotation. Fastly curing resins like, for instance, polyurethane can be fed in components through different channels and pipes to a mixing head right next to the spraying head. In this way no detrimental centrifugal forces are exerted upon the resin at any stage which results in a theoretically unlimited high winding speed. This becomes increasingly important with the increasing (giant) dimensions in the foregoing process, making it even more viable.

By this method all types of "resins" can be applied: nearly all thermoplastics (with heated feeding pipes and hoses), all duroplastics, polyurethane, concrete, etc. To the device, depositing at the mandrel surface, heating or radiating devices may be attached to ensure high speed of curing.

I claim:

1. A machine for continuously winding endless fibres onto an object, the machine having an open ended hollow rotating fibre carrier and guide around the object, the carrier being adapted for the accumulation of turns of fibre on its outside, the guide being adapted to lead the fibre from underneath layers of the turns accumulated on the outside of the hollow carrier inwardly to the object and means adapted to rotate the carrier with the guide wherein the outside of the carrier comprises fibre support means adapted for the easy rotation of the accumulated turns of fibre relative to the carrier, and further comprising a stationary fibre bank for supplying the carrier with fibre, means adapted to reverse the direction of rotation of the carrier and buffer means intermediate between the carrier and the fibre bank adapted to take up turns from the carrier during reverse rotation, the buffer means comprising an outer hollow open-ended rotating carrier and guide, the fibres proceeding from the bank to the outer hollow carrier, being accumulated in several turns on this outer carrier, then proceeding from underneath layers of the turns of the outer carrier inwardly over a guide thereof to an inner hollow carrier, and means adapted to rotate the outer carrier with guide at rotational speeds bearing a constant ratio to rotational speeds at which the inner carrier is rotated both in forward and reverse direction.

2. A machine for winding fibres as claimed in claim 1, in which the constant ratio which the rotational speed of the outer carrier bears to the rotational speed of the inner carrier is equal to the ratio which the effective radius of the inner carrier bears to the sum of the effective radii of the inner carrier and the outer carrier.

3. A machine for winding of fibres as claimed in claim 1, in which either or both carriers comprise a frame on which a plurality of peripheral rollers are journalled with low friction bearings.

4. A machine for winding of fibres as claimed in claim 1, in combination with a tension keeping device interposed between the stationary fibre bank and the outer carrier.

5. A machine for winding of fibres as claimed in claim 1, adapted to apply the wound fibres as a helical reinforcement to material being extruded on a mandrel.

6. A machine for winding of fibres as claimed in claim 5, in which a second similar machine is provided adjacently but adapted to apply an opposite handed helical reinforcement symmetrically with the helical reinforcement applied by the first machine.

7. A machine for winding of fibres as claimed in claim 5, in which the extruding speed of the extrudate is related to the magnitude of the rotational speed, irrespective of direction, so that the helix angle is kept constant during rotational direction changes.

8. A machine for winding of fibres as claimed in claim 5, which comprises a portion of extrusion channel which carries a lip gasket which is rotatable with the rotation of the inner carrier at the same speed, the lip gasket being of low friction material and adapted to admit fibres(s) to the material being extruded on a mandrel but to retain the material within the extrusion channel.

* * * * *